United States Patent
Jeong

(10) Patent No.: US 9,425,715 B2
(45) Date of Patent: Aug. 23, 2016

(54) MOTOR DRIVING CIRCUIT OF EPB SYSTEM FOR REDUCING DARK CURRENT

(71) Applicant: HYUNDAI MOBIS CO., LTD., Seoul (KR)

(72) Inventor: Hyeon Seok Jeong, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 70 days.

(21) Appl. No.: 14/535,180

(22) Filed: Nov. 6, 2014

(65) Prior Publication Data

US 2016/0036357 A1 Feb. 4, 2016

(30) Foreign Application Priority Data

Aug. 4, 2014 (KR) .................. 10-2014-0099667

(51) Int. Cl.
| | |
|---|---|
| *H02P 1/00* | (2006.01) |
| *H02P 3/02* | (2006.01) |
| *B60T 11/10* | (2006.01) |
| *B60T 7/12* | (2006.01) |
| *B60T 7/10* | (2006.01) |
| *B60T 13/74* | (2006.01) |
| *F16D 65/14* | (2006.01) |
| *F16D 121/24* | (2012.01) |

(52) U.S. Cl.
CPC . *H02P 3/02* (2013.01); *B60T 7/107* (2013.01); *B60T 7/12* (2013.01); *B60T 11/103* (2013.01); *B60T 13/741* (2013.01); *B60T 13/746* (2013.01); *F16D 65/14* (2013.01); *F16D 2121/24* (2013.01)

(58) Field of Classification Search
CPC ...... G05B 9/02; H02K 11/38; B60G 2202/42; B60T 11/103; H02H 7/0844; H02P 3/02
See application file for complete search history.

(56) References Cited

U.S. PATENT DOCUMENTS

2013/0082634 A1\* 4/2013 Bokusky .................. G05B 9/02
318/563

FOREIGN PATENT DOCUMENTS

| JP | H05-189272 A | 7/1993 |
|---|---|---|
| JP | 2003-009586 A | 1/2003 |
| JP | 2007-330040 A | 12/2007 |
| KR | 10-0234806 B1 | 9/1999 |
| KR | 10-2003-0065360 A | 8/2003 |
| KR | 10-2004-0106712 A | 12/2004 |
| KR | 10-2009-0059636 A | 6/2009 |
| KR | 10-2013-0057883 A | 6/2013 |

\* cited by examiner

*Primary Examiner* — Karen Masih

(57) ABSTRACT

Disclosed is a motor driving circuit of an EPB system which may reduce dark current. The present invention provides a motor driving circuit, including: a motor which includes two power input terminals to be applied with a battery power and a ground power; an H-bridge circuit which alternatively applies the battery power and the ground power to the two power input terminals in response to four motor driving signals applied from an ECU to drive the motor; an activating transistor which is connected between the battery power and the H-bridge circuit and is activated in response to a fail-safe control signal applied from the ECT to apply the battery power to the H-bridge circuit; and two monitoring units which are connected to corresponding input terminals of two power input terminals of the motor to distribute a voltage level which is applied to the motor and output monitoring signals.

9 Claims, 5 Drawing Sheets

<PRIOR ART>

MOTOR DRIVING CIRCUIT OF EPB SYSTEM FOR REDUCING DARK CURRENT

CROSS-REFERENCE TO RELATED APPLICATIONS

This application claims priority to and the benefit of Korean Patent Application No. 10-2014-0099667 filed in the Korean Intellectual Property Office on Aug. 4, 2014, the entire contents of which are incorporated herein by reference.

TECHNICAL FIELD

The present invention relates to a motor driving circuit of an electronic parking brake system and more particularly, to a motor driving circuit of an electronic parking brake system which may reduce dark current.

BACKGROUND ART

An electronic parking brake (hereinafter, abbreviated as an EPB) system is a parking brake system which is electronically controlled to automatically generate a parking braking force according to an EPB switch and a state (a stationary or driving state) of a vehicle.

The EPB system has a function which automatically applies a parking brake when a vehicle is stationary. Therefore, in a stationary state, even though a driver does not put the brake, the parking brake is not released. Further, when the vehicle starts to travel, if the driver presses an accelerator while the parking brake is locked, the parking brake is automatically released so that the vehicle travels without performing any action, which may enhance safety and convenience of the vehicle.

Recently, the EPB system is configured to be integrated with a caliper and an ECU provided for the EPB drives a motor to allow the caliper to apply a pressure to a wheel disk.

FIG. 1 illustrates a motor driving circuit for an EPB system of the related art.

The motor driving circuit illustrated in FIG. 1 is disclosed in Korean Unexamined Patent Application Publication No. 2013-0057883 (titled "a device for detecting an error of a motor, published on Jun. 3, 2013) and includes a motor driving unit DV which drives a motor M according to a control signal which is applied from an ECU and monitoring units MC1 and MC2 which monitor a state of the motor M.

In FIG. 1, the motor driving unit DV includes four transistors T1 to T4 which configure an H-bridge circuit and the four transistors are connected with corresponding resistors R1 to R4 in parallel, respectively. The four transistors T1 to T4 are correspondingly applied with motor driving signals (not illustrated) which are applied from the ECU to be turned on/off to apply a battery power BATT and a ground power Vss to two power input terminals of the motor M, thereby driving the motor.

A reverse-polarity protecting transistor F1 for reverse-polarity protection is connected between the battery power BATT and one terminal of the H-bridge circuit and an activating transistor F2 which activates the H-bridge circuit in response to a fail-safe control signal FSC which is applied from the ECU is connected between the other terminal of the H-bridge circuit and the ground power VSS.

In the meantime, two monitoring units MC1 and MC2 are connected to corresponding input terminals of two power input terminals of the motor M, respectively. The monitoring units MC1 and MC2 do not directly receive a power which is input to the motor, but distributes the power to have an appropriate voltage level for monitoring using three resistors (R11, R12, and R13) and (R21, R22, and R23) to output monitoring signals MON1 and MON2.

The motor driving circuit of FIG. 1 includes the monitoring units MC1 and MC2 to analyze the monitoring signal and detect whether the motor is open or whether to be short from the battery power BATT and the ground power Vss.

However, the motor driving circuit of FIG. 1 is configured such that the monitoring units MC1 and MC2 output the monitoring signals using the resistors (R11, R12, and R13) and (R21, R22, and R23) respectively. Therefore, two current paths P1 and P2 through which the battery power BATT is connected with the ground power Vss through the resistors R1 and R3 of the motor driving unit DV and the resistors R12, R13 and R22, R23 of the monitoring units MC1 and MC2 are generated. A unit for controlling a current is not provided on the current paths. Therefore, dark current which is not intended at the time of designing a motor driving circuit is generated. The dark current varies depending on a resistance of the resistors which are applied to the motor driving circuit, but the resistances of the resistors are generally several tens to several hundreds kΩ when considering a characteristic of the EPB system and thus the dark current may be 100 μA. However, this indicates dark current which is generated in one motor driving circuit. Therefore, the caliper integrated EPB in the vehicle drives two motors so that approximately 200 μA of dark current may be generated in the motor driving circuit for the EPB system in every vehicle.

The current which is consumed by the dark current uses current which is charged in a battery of the vehicle, so that even a small amount of consumed current may affect the driving of the vehicle in the future. Further, in the case of a rechargeable battery for a vehicle, when the current is continuously consumed by the dark current, the life span of the battery may be shortened. Therefore, the dark current must be reduced.

SUMMARY OF THE INVENTION

The present invention has been made in an effort to provide a motor driving circuit of an electronic parking brake system which may reduce dark current by blocking a path of the dark current.

According to an exemplary embodiment of the present invention, a motor driving circuit of an electronic parking brake system which may reduce dark current includes a motor which includes two power input terminals and is driven by receiving a battery power and a ground power; an H-bridge circuit which alternatively applies the battery power and the ground power to the two power input terminals in response to four motor driving signals applied from an ECU to drive the motor; an activating transistor which is connected between the battery power and the H-bridge circuit and is activated in response to a fail-safe control signal applied from the ECU to apply the battery power to the H-bridge circuit; and two monitoring units which are connected to corresponding input terminals of two power input terminals of the motor to distribute a voltage level which is applied to the motor and output monitoring signals.

The motor driving circuit may further include a fail-safe control signal generating circuit which is applied with a fail-safe signal, a first control signal, and a second control signal from the ECU to generate the fail-safe control signal and apply the fail-safe control signal to a gate of the activating transistor.

The fail-safe control signal generating circuit may include a control signal generating unit in which one end is connected to a gate of the activating transistor to apply the fail-safe control signal to the gate of the activating transistor in response to the first control signal, a fail-safe activating unit in which one end is connected to the other end of the control signal generating unit and the other end is connected to the ground power and which fixes a signal level of the fail-safe control signal according to a first signal level of the fail-safe signal regardless of the signal levels of the first and second control signals to turn off the activating transistor; and an FET checking unit in which one end is connected to the fail-safe activating unit and the other end is connected to the ground power and which activates or inactivates the fail-safe activating unit in response to the second control signal when the fail-safe signal is in a second level.

The control signal generating unit may include: a first resistor which is a pull-up resistor which is connected between the battery power and the gate of the activating transistor to stabilize a level of the fail-safe control signal; a second resistor in which one end is connected with the gate of the activating transistor and the first resistor in parallel; and a first transistor which is connected between the other end of the second resistor and the fail-safe activating unit and emitter-biased to be applied with the first control signal through a base.

The fail-safe activating unit may include: a second transistor which is connected between the emitter of the first transistor and the ground power and emitter-biased to be applied with the fail-safe signal through a base.

The FET checking unit may include: a third transistor which is connected between the base of the second transistor and the ground power and emitter-biased to be applied with the second control signal through a base.

The fail-safe control signal generating circuit may include: a third resistor which is a pull-up resistor connected between the battery power and a collector of the second transistor; and a diode which is connected between the control signal generating unit and the fail-safe activating unit to block a current which is applied through the third resistor from being applied to the ground power.

The ECU may vary signal levels of the first control signal and the second control signal when the fail-safe signal is in a second level which is an inactivate state, determine whether the activating transistor is turned on or off, corresponding to the varied signal levels of the first control signal and the second control signal by receiving monitoring signals applied from two monitoring units and determine whether an error occurs in the first to third transistors from the determination result.

According to the present invention, the motor driving circuit of an electronic parking brake system which reduces dark current may block dark current while suppressing the cost from being increased by simply changing a circuit to adjust the position of the circuit activating transistor in the motor driving circuit of the EPB of the related art. Further, the present invention may efficiently cope with a subordinate problem such as a state when an error which may occur by changing the circuit is not detected.

DETAILED DESCRIPTION OF THE INVENTION

Figure 1:
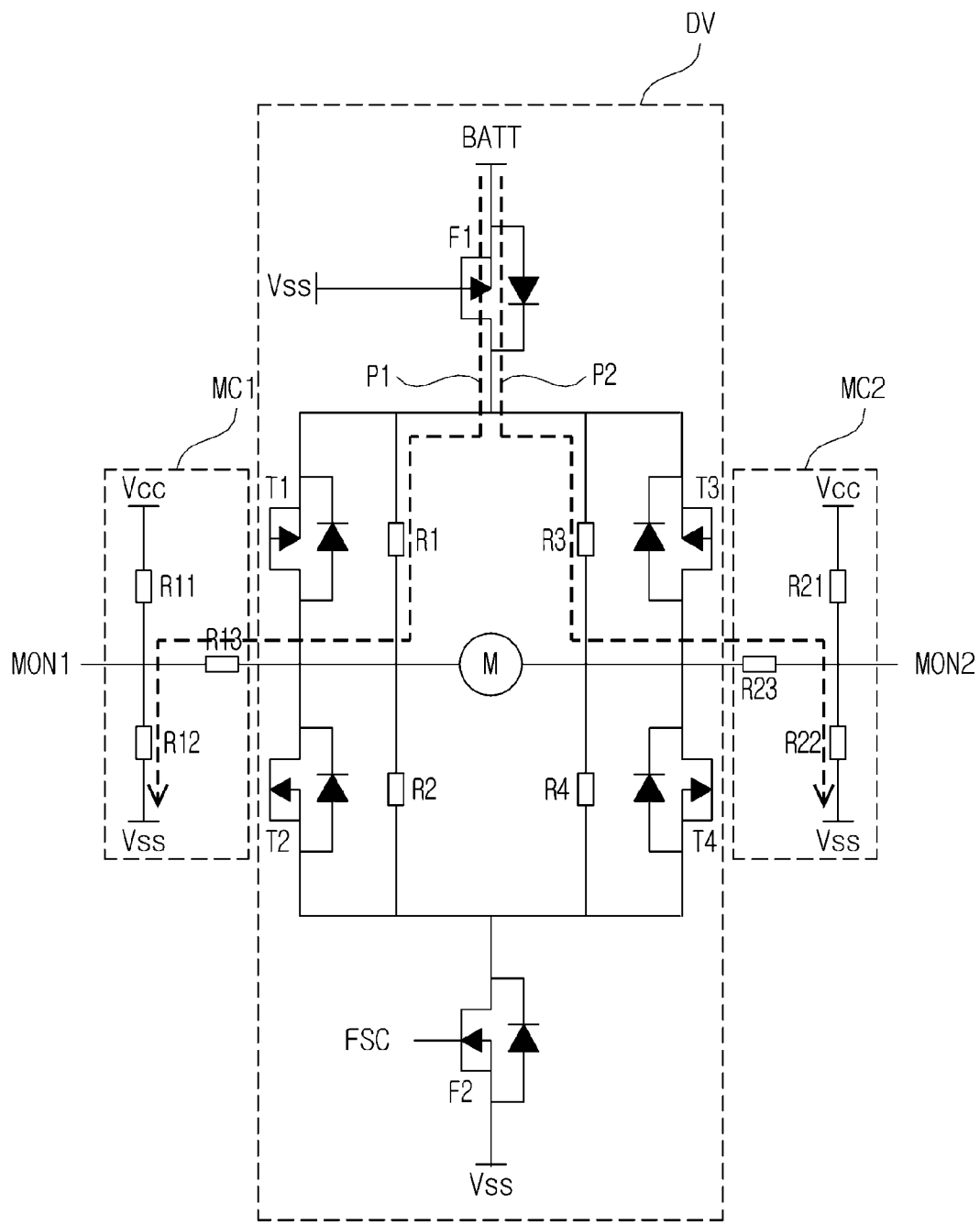
FIG. 1 illustrates a motor driving circuit for an EPB system of the related art.

In order to sufficiently understand the present invention, the operational advantages of the present invention, and the objectives achieved by the embodiments of the present invention, the accompanying drawings illustrating preferred embodiments of the present invention and the contents described therein need to be referred to.

Hereinafter, the present invention will be described in detail by explaining preferred embodiments of the present invention with reference to the accompanying drawings. However, the present invention can be realized in various different forms, and is not limited to the exemplary embodiments described herein. In order to clearly describe the present invention, a part which may obscure the present invention may be omitted and like reference numerals denote like components.

In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" and "block" described in the specification mean units for processing at least one function and operation and can be implemented by hardware components or software components and combinations thereof.

Figure 2:
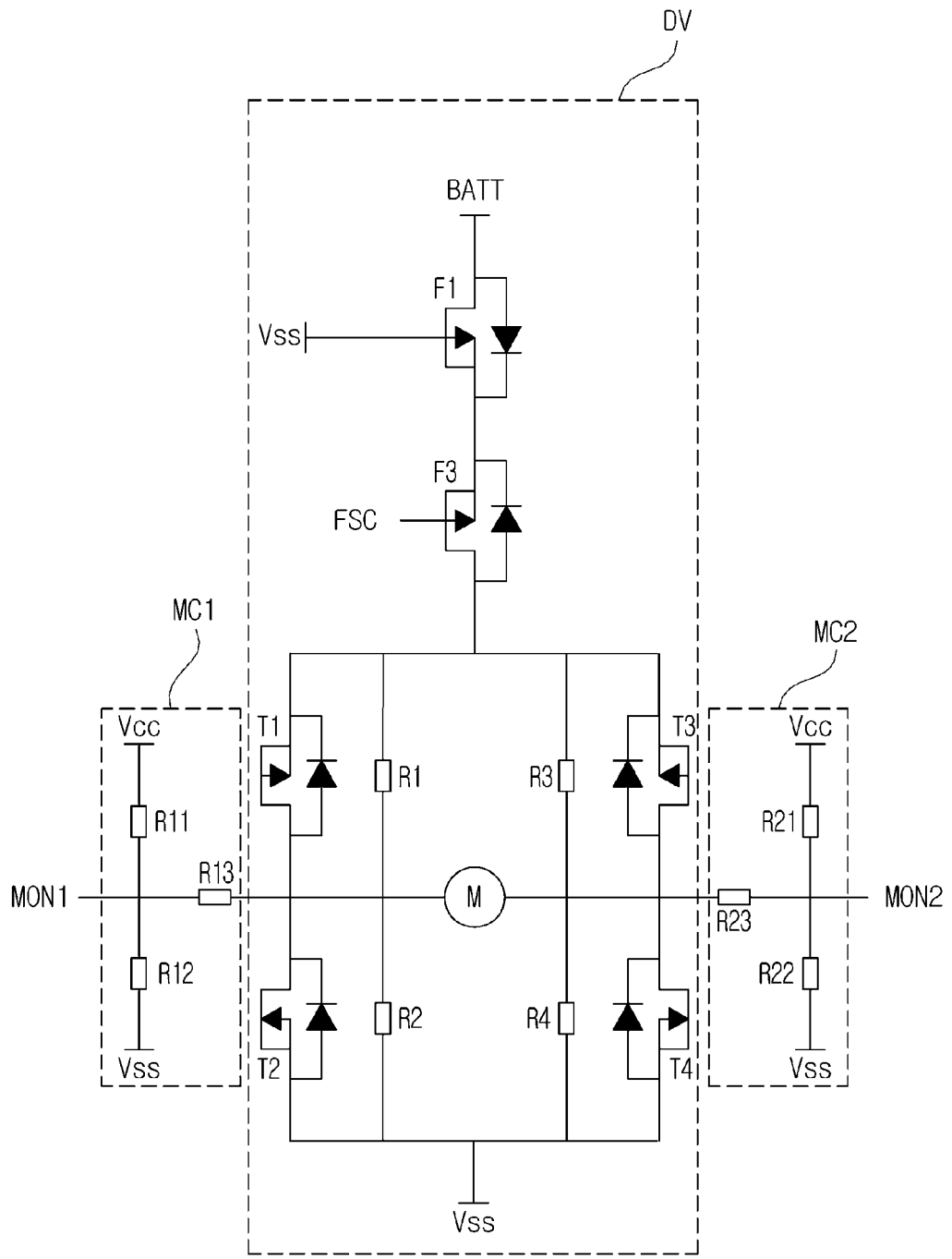
FIG. 2 illustrates a motor driving circuit for an EPB system according to an exemplary embodiment of the present invention.

FIG. 2 illustrates a motor driving circuit for an EPB system according to an exemplary embodiment of the present invention.

Referring to FIG. 2, a motor driving circuit according to an exemplary embodiment of the present invention includes a motor driving unit DV which drives a motor M and monitoring units MC1 and MC2 which monitor a state of the motor M, which is similar to the motor driving circuit of FIG. 1.

The motor driving unit DV is configured by an activating unit and an H-bridge circuit which are connected in series between a battery power BATT and a ground power Vss. The activating unit is connected between the battery power BATT and the H-bridge circuit to activate the motor driving unit DV and prevents a reverse polarity. The H-bridge circuit applies a battery power BATT and a ground power Vss to two power input terminals of the motor M in accordance with a control signal which is applied from an ECU.

In the activating unit, a reverse polarity protecting transistor F1 and an activating transistor F3 which activates the H-bridge circuit in response to the fail-safe control signal FSC which is applied from the ECU are connected in series between the battery power BATT and one terminal of the H-bridge circuit. The reverse polarity protecting transistor F1 is applied with a gate voltage so as to maintain an activated state all the times and serves as a diode which allows the current to flow in one direction. Therefore, even when a reverse polarity is applied to the battery power BATT, the reverse polarity protecting transistor F1 protects the motor M.

The activating transistor F3 applies the battery power BATT to the H-bridge circuit in response to the fail-safe control signal FSC which is applied from the ECU. In the motor driving circuit of the related art illustrated in FIG. 1, the activating transistor F2 is connected between the H-bridge circuit and the ground power Vss to activate or inactivate the H-bridge circuit. In contrast, the activating transistor F3 of the motor driving circuit according to the exemplary embodiment of the present invention is connected between the battery power BATT and the H-bridge circuit. The activating transistor F3 is turned on in accordance with a signal level of the fail-safe control signal FSC to apply the battery power BATT to the H-bridge circuit to activate the H-bridge circuit.

However, even though the activating transistor F2 of FIG. 1 is connected to the ground power Vss so as to be realized as an N-channel FET, the activating transistor F3 according to the exemplary embodiment of the present invention is connected to the battery power BATT to be desirably realized as a P channel FET.

The activating transistor F3 will be described in detail below.

The H-bridge circuit includes a first bridge transistor T1 and a first bridge resistor R1 which are connected in parallel between the activating unit and a first power input terminal of two power input terminals of the motor, a second bridge transistor T2 and a second bridge resistor R2 which are connected in parallel between the first power input terminal and the ground power Vss, a third bridge transistor T3 and a third bridge resistor R3 which are connected in parallel between the activating unit and a second power input terminal of the motor, and a fourth bridge transistor T4 and a fourth bridge resistor R4 which are connected in parallel between the second power input terminal and the ground power Vss. Each of four bridge transistors T1 to T4 of the H-bridge circuit is applied with a corresponding motor driving signal among four motor driving signals (not illustrated) applied from the ECU to be turned on/off. The four motor driving signals which are applied from the ECU alternately activate two bridge transistors T1 and T4 or T2 and T3 among four bridge transistors T1 to T4 to alternately apply the battery power BATT or the ground power Vss to two power input terminals of the motor M.

Two monitoring units MC1 and MC2 are connected to corresponding input terminals of two power input terminals of the motor M and the monitoring units MC1 and MC2 distribute the power which is input to the motor using three resistors (R11, R12, and R13) and (R21, R22, and R23) respectively to output monitoring signals MON1 and MON2.

As a result, when the motor driving circuit according to the exemplary embodiment of the present invention illustrated in FIG. 2 is compared with the motor driving circuit of the related art illustrated in FIG. 1, a position of the activating transistor F3 is moved between the battery power BATT and the H-bridge circuit and an N channel FET is changed to switched into a P channel FET, but the number of components of the motor driving circuit is not changed. Nevertheless, in the motor driving circuit of FIG. 2, the activating transistor F3 is disposed between the battery power BATT and the H-bridge circuit, so that when the activating transistor F3 is inactivated according to a signal level of the fail-safe control signal FSC, the battery power BATT is not applied to the H-bridge circuit. Therefore, a current path where dark current is generated in FIG. 1 is not formed. In other words, it is possible to suppress the dark current only by applying minimum change to the motor driving circuit of the related art.

However, since the activating transistor F3 is changed to the P channel FET, as compared with the activating transistor F2 which is realized as the N channel FET, a signal level of the fail-safe control signal FSC which activates the activating transistor F3 is reversed. However, the fail-safe control signal FSC is adjusted by the ECU, so that when the ECU is set to output a reverse signal level of the fail-safe control signal FSC, the operation of the activating transistor F3 may be controlled by the same manner as the related art.

Even though it is described that the activating transistor F3 is realized as the P channel FET, the activating transistor F3 may be realized as the N channel transistor, similarly to the activating transistor F2 of FIG. 1. However, in the exemplary embodiment of the present invention, since the activating transistor F3 is disposed at the battery power BATT side with respect to the H-bridge circuit, when the activating transistor is realized as the N channel FET, the voltage may drop. In order to prevent the voltage from dropping, a separate charge pump is required to pump up the signal level of the fail-safe control signal FSC. In other words, an additional circuit configuration is required.

On contrast, when the P channel FET is applied, no additional circuit is required but an applicable element is restricted as compared with the N channel FET. Hereinafter, for the convenience of description, with respect to the H-bridge circuit, the battery power BATT side is referred to as a high side and the ground power Vss side is referred to as a low side.

Figure 3A:
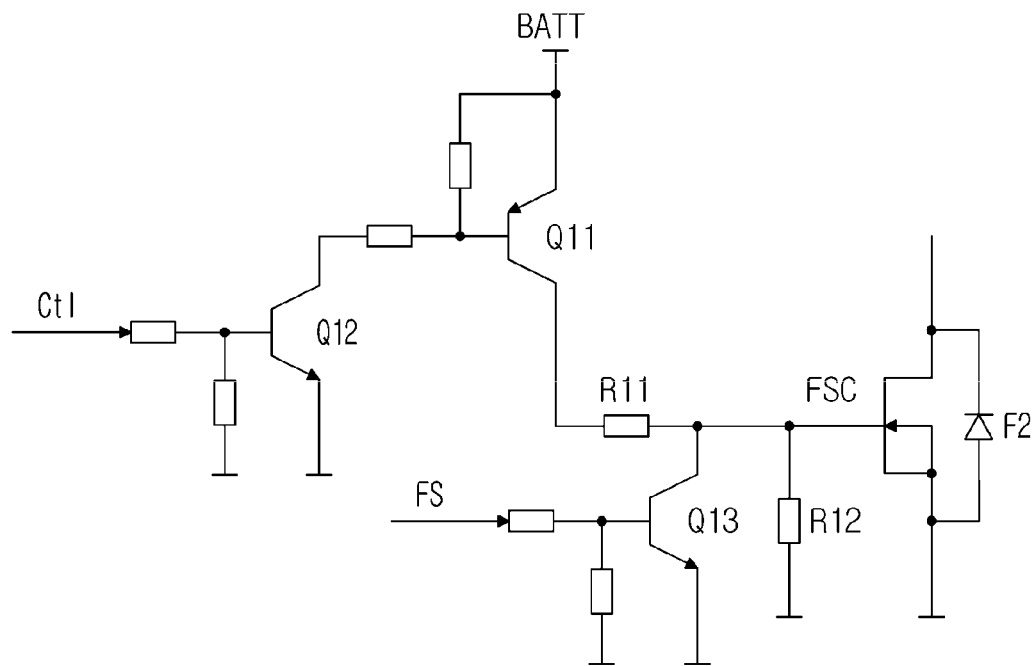
FIGS. 3A and 3B illustrate a circuit configuration which generates a fail-safe control signal which is applied to an activating transistor of FIGS. 1 and 2.
Figure 3B:
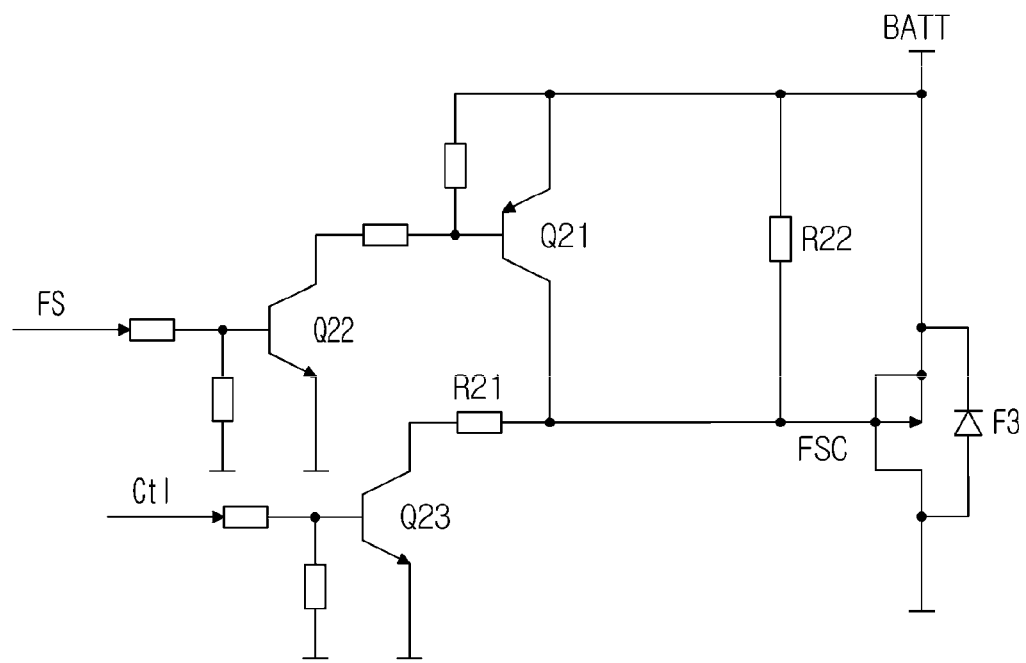

FIGS. 3A and 3B illustrate a circuit configuration which generates a fail-safe control signal which is applied to an activating transistor of FIGS. 1 and 2.

FIG. 3A illustrates a circuit configuration which generates a fail-safe control signal FSC which is applied to the activating transistor F2 of FIG. 1 and FIG. 3B illustrates a circuit configuration which generates a fail-safe control signal FSC which is applied to the activating transistor F3 of FIG. 2.

Even though it is described that the ECU directly applies the fail-safe control signal FSC in FIGS. 1 and 2, the ECU actually outputs a fail-safe signal FS and a control signal Ctl and the fail-safe signal FS and the control signal Ctl are applied to a fail-safe control signal generating circuit illustrated in FIGS. 3A and 3B to generate a fail-safe control signal FSC.

Tables 1 and 2 represent signal levels of the fail-safe signal FS and the control signal Ctl, state change of the activating transistors F2 and F3 corresponding to a signal level of the fail-safe control signal FSC which is generated according to the signal levels of the fail-safe signal FS and the control signal Ctl, and a meaning of the signal status, in the fail-safe control signal generating circuit of FIGS. 3A and 3B.

TABLE 1

| Control | Fail-safe | Q11 | Q12 | Q13 | F2 | Remarks |
|---|---|---|---|---|---|---|
| Low | Low | Off | Off | Off | Off | Default setting when motor is not driven |
| High | Low | On | On | Off | On | Setting when motor is driven |
| Low | High | Off | Off | Off | Off | Default setting at the time of fail-safe operation |
| High | High | On | On | On | Off | Setting at the time of fail-safe operation |

TABLE 2

| Control | Fail-safe | Q21 | Q22 | Q23 | F3 | Remarks |
|---|---|---|---|---|---|---|
| Low | Low | Off | Off | Off | Off | Default setting when motor is not driven |
| High | Low | Off | Off | On | On | Setting when motor is driven |
| Low | High | On | On | Off | Off | Default setting at the time of fail-safe operation |

TABLE 2-continued

| Control | Fail-safe | Q21 | Q22 | Q23 | F3 | Remarks |
|---|---|---|---|---|---|---|
| High | High | On | On | On | Off | Setting at the time of fail-safe operation |

When Table 1 and Table 2 are compared, it may be understood that even though on/off statuses of the transistors Q11, Q12, Q13 and Q21, Q22, Q23 are different from each other in the circuit of FIGS. 3A and 3B, the status changes of the activating transistors F2 and F3 according to the signal levels of the fail-safe signal FS and the control signal Ctl may be set to be consequently same. That is, it is understood that the ECU controls the motor driving circuit of FIG. 2 by the same manner as the manner of controlling the motor driving circuit of FIG. 1.

However, in the fail-safe control signal FSC generating circuit in FIGS. 3A and 3B, the on/off statuses of the transistors Q11, Q12, Q13 and Q21, Q22, Q23 according to the signal level of the fail-safe signal FS and the control signal Ctl are different from each other, which may cause another problems when an error occurs in the transistors Q11, Q12, Q13 and Q21, Q22, Q23.

Table 3 and Table 4 represent whether to unintentionally drive the motor when an error occurs in each transistor in the fail-safe control signal generating circuit of FIGS. 3A and 3B.

TABLE 3

| Q11 | Q12 | Q13 | F2 | Whether to drive motor | Remarks |
|---|---|---|---|---|---|
| Open | Normal | Normal | Off | X | |
| Short | Normal | Normal | Controllable | X | Shut off driving of motor by FS signal |
| Normal | Open | Normal | Off | X | |
| Normal | Short | Normal | Controllable | X | Shut off driving of motor by FS signal |
| Normal | Normal | Open | Controllable | ○ | It is difficult to check error of Q3 due to normal state |
| Normal | Normal | Short | Off | X | |

TABLE 4

| Q21 | Q22 | Q23 | F3 | Whether to drive motor | Remarks |
|---|---|---|---|---|---|
| Open | Normal | Normal | Controllable | ○ | It is difficult to check error of Q1 due to normal state |
| Short | Normal | Normal | Off | X | |
| Normal | Open | Normal | Controllable | ○ | It is difficult to check error of Q2 due to normal state |
| Normal | Short | Normal | Off | X | |
| Normal | Normal | Open | Off | X | |
| Normal | Normal | Short | Controllable | X | Shut off driving of motor by FS signal |

As represented in Table 3, the fail-safe control signal generating circuit of FIG. 3A cannot check the error only when an error occurs due to an open status of the third transistor Q13.

To the contrary, in Table 4, the fail-safe control signal generating circuit of FIG. 3B cannot check the error when the error occurs due to the open state of the first transistor Q21 or the second transistor Q22. In this case, a possibility that the fail-safe operation may not be normally performed is increased.

Accordingly, as illustrated in FIG. 2, even when the activating transistor F3 is provided at the high side, the fail-safe control signal generating circuit needs to be changed so as to check the error of the transistor at the same level as the case when the activating transistor F2 is provided at the low side.

The reason why the fail-safe control signal generating circuit illustrated in FIG. 3B cannot detect the error of the transistor is that a specific transistor operates only in a fail-safe state. Therefore, the fail-safe control signal generating circuit may be modified so that all transistors operate in the normal state and the fail-safe state.

Figure 4:
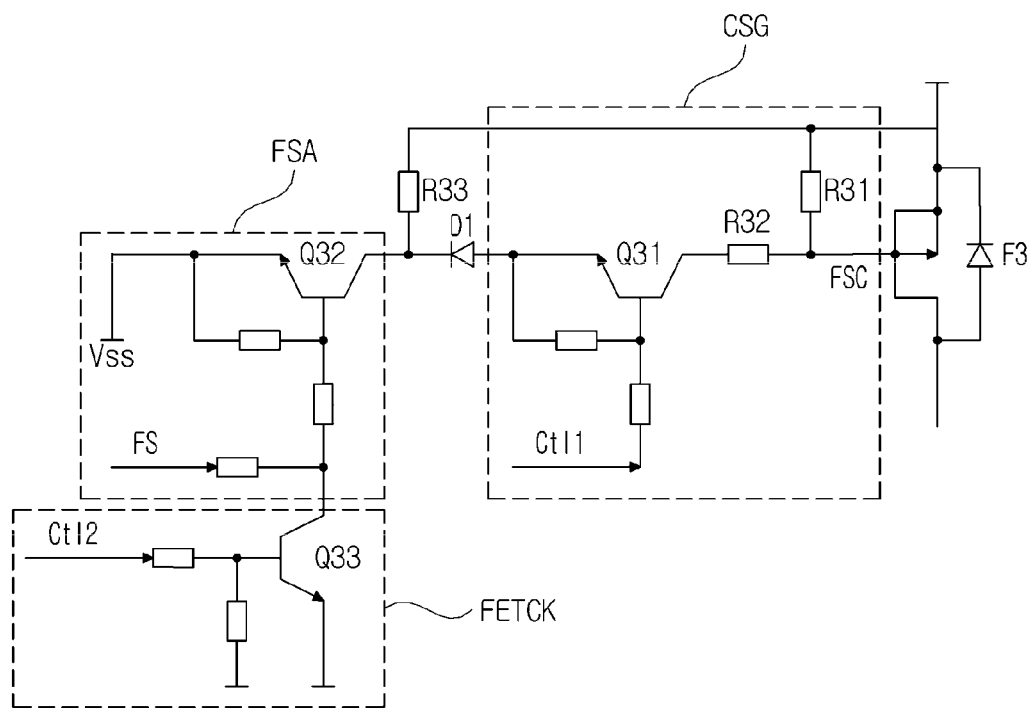
FIG. 4 illustrates an example of a fail-safe control signal generating circuit according to an exemplary embodiment of the present invention.

FIG. 4 illustrates an example of a fail-safe control signal generating circuit according to an exemplary embodiment of the present invention.

The fail-safe control signal generating circuit of FIG. 4 includes a control signal generating unit CSG whose one end is connected to a gate of an activating transistor F3, a fail-safe activating unit FSA in which one end is connected to the other end of the control signal generating unit CSG and the other end is connected to a ground power Vss, and an FET checking unit FETCK in which one end is connected to the fail-safe activating unit FSA and the other end is connected to the ground power.

The control signal generating unit CSG includes a first resistor R31 which is a pull-up resistor connected between the battery power BATT and a gate of the activating transistor F3 to stabilize a signal level of the fail-safe control signal FSC, a second resistor R32 and an emitter-biased first transistor Q31 which are connected in series between the gate of the activating transistor F3 and the fail-safe activating unit FSA. A first control signal Ctl1 is applied to a base of the first transistor Q31.

The fail-safe activating unit FSA includes an emitter biased second transistor Q32 which is connected between an emitter of the first transistor Q31 and the ground power Vss. The fail-safe signal FS is applied to a base of the second transistor Q32.

In the meantime, the FET checking unit FETCK includes an emitter biased third transistor Q33 which is connected between a base of the second transistor Q32 and the ground power Vss and a second control signal Ctl2 is applied to a base of the third transistor Q33.

An operation of the fail-safe control signal generating circuit according to a signal level of the fail-safe signal FS and the first and second control signals Ctl1 and Ctl2 is represented in Table 5.

TABLE 5

| NO | FS | Ctl1 | Ctl2 | Q31 | Q32 | Q33 | F3 | Remarks |
|---|---|---|---|---|---|---|---|---|
| 1 | Low | X | X | Off | Off | Off | Off | Default setting at the time of fail-safe operation |
| 2 | High | Low | Low | Off | On | Off | Off | Setting when whether FET is on/off is checked |
| 3 | High | High | Low | On | On | Off | On | Setting when motor is driven |
| 4 | High | Low | High | Off | Off | On | Off | Default setting when motor is not driven |
| 5 | High | High | High | Off | Off | On | Off | Setting when whether FET is on/off is checked |

The fail-safe control signal generating circuit of FIG. 4 is applied with two control signals Ctl1 and Ctl2, which is different from the fail-safe control signal generating circuit of FIG. 3 in order to check whether the activating transistor F3 is turned on or off. During the process of checking whether the activating transistor F3 is turned on or off, whether to occur error in the first to third transistors Q31, Q32, and Q33 may be determined as represented in Table 6.

TABLE 6

| NO | Q31 | Q32 | Q33 | F3 | Whether to drive motor | Remarks |
|---|---|---|---|---|---|---|
| 1 | Normal | Open | Normal | Off | X | |
| 2 | Normal | Short | Normal | Controllable | X | Error of Q1 is checked by checking whether FET is on/off |
| 3 | Open | Normal | Normal | Off | X | |
| 4 | Short | Normal | Normal | Controllable | X | Error of Q2 is checked by checking whether FET is on/off |
| 5 | Normal | Normal | Open | Controllable | X | Error of Q3 is checked by checking whether FET is on/off |
| 6 | Normal | Normal | Short | Off | X | |

Among six statuses represented in Table 6, the activating transistor F3 is turned off regardless of the signal levels of the control signals Ctl1 and Ctl2 in first, third, and sixth states so that it is possible to easily check whether errors occur in the three transistors Q31, Q32, and Q33. However, the error of the transistors Q31, Q32, and Q33 may be checked by checking whether the activating transistor F3 is turned on or off in second, fourth, and fifth states, as represented in Table 7.

TABLE 7

| NO | FS | Ctl1 | Ctl2 | Q31 | Q32 | Q33 | F3 (Expected) | F3 (Actual) |
|---|---|---|---|---|---|---|---|---|
| 1 | High | Low | Low | Normal | Short | Normal | Off | Off |
| 2 | High | Low | Low | Short | Normal | Normal | Off | On |
| 3 | High | Low | Low | Normal | Normal | Open | Off | Off |
| 4 | High | High | High | Normal | Short | Normal | Off | On |
| 5 | High | High | High | Short | Normal | Normal | Off | Off |
| 6 | High | High | High | Normal | Normal | Open | Off | On |

In Table 7, an expected state of the activating transistor F3 is a state when no error occurs in the transistors Q31, Q32, and Q33 and an actual state of the activating transistor F3 is a state when an error occurs in the transistors Q31, Q32, and Q33. A result of an actual state of the activating transistor F3 may vary depending on signal level conditions of the first and second control signals Ctl1 and Ctl2. When the expected state does not coincide with the actual state, it is determined that the error occurs in the transistors Q31, Q32, and Q33.

The fail-safe control signal generating circuit of FIG. 4 may further include a third resistor R33 which is provided between the battery power BATT and a collector of the second transistor Q32 and a diode D1 which is provided between the first transistor Q31 and the second transistor Q32.

In the fail-safe control signal generating circuit of FIG. 4, when the second transistor Q32 is turned off, a collector terminal of the second transistor Q32 is floated so that a voltage level is unstable and thus error may occur due to an external noise. Therefore, according to the exemplary embodiment of the present invention, a third resistor R33 which is a pull-up resistor is provided to stabilize a signal level between the first transistor Q31 and the second transistor Q32.

Figure 5A:
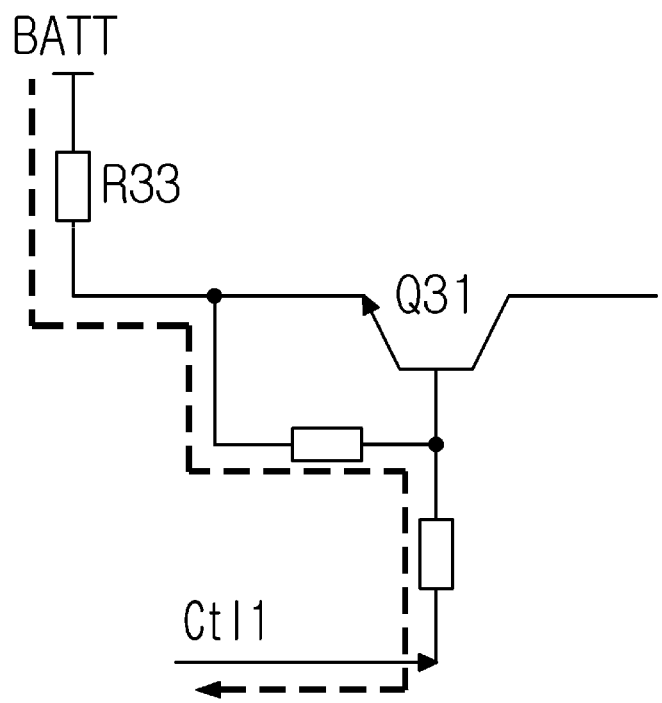
FIGS. 5A and 5B are a view illustrating a function of a diode of FIG. 4.
Figure 5B:
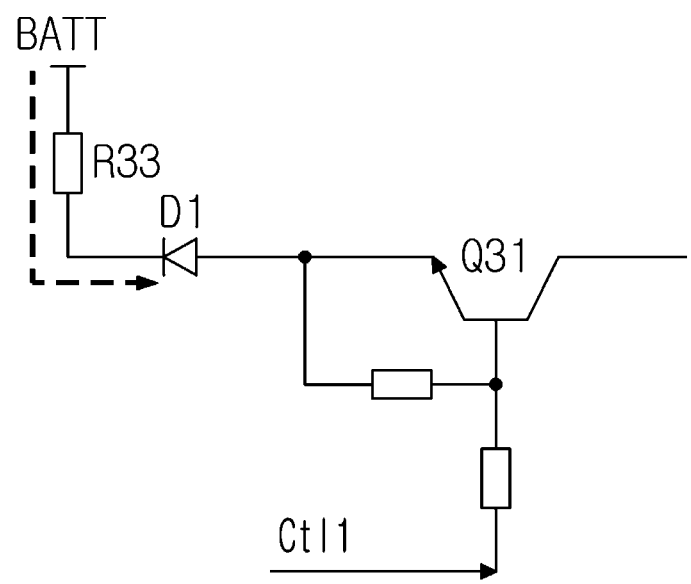

FIGS. 5A and 5B are a view illustrating a function of a diode of FIG. 4.

FIG. 5A is a view illustrating a current path which may be generated when no diode is provided in the fail-safe control signal generating circuit of FIG. 4 and FIG. 5B is a view illustrating a function of the diode. As described above, in the fail-safe control signal generating circuit of FIG. 4, the first to third transistors Q31, Q32, and Q33 are realized in an emitter biased state. Among these, in the case of the first transistor Q31, a current path from the third resistor R33 which is added to stabilize the signal level to the ground power Vss through a resistor provided for emitter-bias is generated as illustrated in FIG. 5A. Such a current path may cause another dark current. Therefore, according to the exemplary embodiment of the present invention, as illustrated in FIG. 5B, a diode D1 is disposed between the third resistor and an emitter biased first transistor Q31 to block a current path through which dark current is generated.

As a result, the motor driving circuit of an electronic parking brake system according to the exemplary embodiment of the present invention which may reduce dark current may block dark current while suppressing increase of cost at most by simply changing a circuit to adjust a position of a circuit activating transistor in a motor driving circuit of the EPB of the related art. Further, even when the circuit is changed, the fail-safe function may be normally performed.

The present invention has been described with reference to the exemplary embodiment illustrated in the drawing, but the exemplary embodiment is only illustrative, and it would be appreciated by those skilled in the art that various modifications and equivalent exemplary embodiments may be made. Accordingly, the actual scope of the present invention must be determined by the spirit of the appended claims.

What is claimed is:

1. A motor driving circuit, comprising:
   a motor which includes two power input terminals and is driven by receiving a battery power and a ground power;
   an H-bridge circuit which alternatively applies the battery power and the ground power to the two power input terminals in response to four motor driving signals applied from an ECU to drive the motor;
   an activating transistor which is connected between the battery power and the H-bridge circuit and is activated in response to a fail-safe control signal to apply the battery power to the H-bridge circuit;
   two monitoring units which are connected to corresponding input terminals of the two power input terminals of the motor to distribute a voltage level which is applied to the motor and output monitoring signals; and
   a fail-safe control signal generating circuit which is applied with a fail-safe signal, a first control signal, and a second control signal from the ECU to generate the fail-safe control signal and apply the fail-safe control signal to a gate of the activating transistor.

2. The motor driving circuit of claim 1, wherein the activating transistor is a P channel FET transistor.

3. The motor driving circuit of claim 1, wherein the fail-safe control signal generating circuit includes:
   a control signal generating unit in which one end is connected to the gate of the activating transistor to apply the fail-safe control signal to the gate of the activating transistor in response to the first control signal;
a fail-safe activating unit in which one end is connected to the other end of the control signal generating unit and the other end is connected to the ground power and which fixes a signal level of the fail-safe control signal according to a first signal level of the fail-safe signal regardless of the signal levels of the first and second control signals to turn off the activating transistor; and
an FET checking unit in which one end is connected to the fail-safe activating unit and the other end is connected to the ground power and which activates or inactivates the fail-safe activating unit in response to the second control signal when the fail-safe signal is in a second signal level.

4. The motor driving circuit of claim 3, wherein the control signal generating unit includes:
a first resistor which is a pull-up resistor which is connected between the battery power and the gate of the activating transistor to stabilize a signal level of the fail-safe control signal;
a second resistor in which one end is connected with the gate of the activating transistor and the first resistor in parallel; and
a first transistor which is connected between the other end of the second resistor and the fail-safe activating unit and is emitter-biased to be applied with the first control signal through a base.

5. The motor driving circuit of claim 4, wherein the fail-safe activating unit includes: a second transistor which is connected between an emitter of the first transistor and the ground power and is emitter-biased to be applied with the fail-safe signal through a base.

6. The motor driving circuit of claim 5, wherein the FET checking unit includes: a third transistor which is connected between the base of the second transistor and the ground power and is emitter-biased to be applied with the second control signal through a base.

7. The motor driving circuit of claim 6, wherein the fail-safe control signal generating circuit further includes:
a third resistor which is a pull-up resistor connected between the battery power and a collector of the second transistor; and
a diode which is connected between the control signal generating unit and the fail-safe activating unit to block a current which is applied through the third resistor from being applied to the ground power.

8. The motor driving circuit of claim 6, wherein the ECU varies signal levels of the first control signal and the second control signal when the fail-safe signal is in the second signal level which is an inactivate state, determines whether the activating transistor is turned on or off, corresponding to the varied signal levels of the first control signal and the second control signal by receiving monitoring signals applied from the two monitoring units and determines whether an error occurs in the first to third transistors from the determination result.

9. The motor driving circuit of claim 1, wherein the H-bridge circuit includes:
a first bridge transistor and a first bridge resistor which are connected in parallel between the activating transistor and a first power input terminal of the two power input terminals of the motor;
a second bridge transistor and a second bridge resistor which are connected in parallel between the first power input terminal and the ground power;
a third bridge transistor and a third bridge resistor which are connected in parallel between the activating transistor and a second power input terminal of the two power input terminals; and
a fourth bridge transistor and a fourth bridge resistor which are connected in parallel between the second power input terminal and the ground power.

* * * * *